US008550818B2

(12) United States Patent
Fidaleo et al.

(10) Patent No.: US 8,550,818 B2
(45) Date of Patent: *Oct. 8, 2013

(54) SYSTEM AND METHOD FOR PROVIDING AND MODIFYING A PERSONALIZED FACE CHART

(75) Inventors: Douglas Fidaleo, San Diego, CA (US); Brent Foust, San Diego, CA (US); Jennifer Neuman, San Diego, CA (US); Satya Mallick, San Diego, CA (US); Kevin Barnes, San Diego, CA (US); David Kriegman, San Diego, CA (US)

(73) Assignee: Photometria, Inc., La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,674

(22) Filed: Sep. 25, 2011

(65) Prior Publication Data

US 2012/0027269 A1    Feb. 2, 2012

Related U.S. Application Data

(63) Continuation-in-part of application No. 12/784,797, filed on May 21, 2010.

(51) Int. Cl.
G09B 19/00    (2006.01)

(52) U.S. Cl.
USPC ............................................. 434/99; 434/100

(58) Field of Classification Search
USPC .................................................. 434/99–100
See application file for complete search history.

(56) References Cited

U.S. PATENT DOCUMENTS

| 4,455,320 | A  | * | 6/1984 | Syrmis ........................ 426/383 |
| 4,776,796 | A  | * | 10/1988 | Nossal ............................ 434/94 |
| 4,872,056 | A  | * | 10/1989 | Hicks et al. .................. 348/584 |
| 5,060,171 | A  | * | 10/1991 | Steir et al. .................... 345/630 |
| 5,404,426 | A  | * | 4/1995 | Usami et al. ................. 345/420 |
| 5,517,610 | A  | * | 5/1996 | Takeda et al. ................ 705/500 |
| 5,835,616 | A  | * | 11/1998 | Lobo et al. ................... 382/118 |
| 5,905,807 | A  | * | 5/1999 | Kado et al. ................... 382/118 |
| 6,141,431 | A  | * | 10/2000 | Munetsugu et al. .......... 382/100 |
| 6,385,628 | B1 | * | 5/2002 | Massarsky .................... 715/205 |
| 6,453,052 | B1 | * | 9/2002 | Kurokawa et al. ............ 382/100 |
| 6,484,901 | B1 | * | 11/2002 | Kim .................................. 221/7 |
| 6,619,860 | B1 | * | 9/2003 | Simon .......................... 382/112 |
| 6,845,171 | B2 | * | 1/2005 | Shum et al. .................. 382/100 |
| 7,027,622 | B2 | * | 4/2006 | Pengwu ........................ 382/118 |
| 7,532,752 | B2 | * | 5/2009 | Wen et al. .................... 382/162 |
| 7,648,364 | B2 | * | 1/2010 | Dauga et al. ................. 434/100 |
| 7,660,482 | B2 | * | 2/2010 | Huang et al. ................. 382/275 |
| 7,724,287 | B2 | * | 5/2010 | Cazier et al. .............. 348/222.1 |
| 7,950,925 | B2 | * | 5/2011 | McDaniel et al. ............ 434/377 |
| 8,107,672 | B2 | * | 1/2012 | Goto ............................ 382/100 |
| 2001/0037191 | A1 | * | 11/2001 | Furuta et al. ..................... 703/6 |
| 2003/0065255 | A1 | * | 4/2003 | Giacchetti et al. ............ 600/407 |

(Continued)

Primary Examiner — Robert J Utama
(74) Attorney, Agent, or Firm — Cotman IP Law Group, PLC

(57) ABSTRACT

A system and method for providing a personalized digital face chart. A digital image of a subject's face is obtained. A facial region of the digital image is identified from a background region of the digital image. A line drawing is generated based on at least the facial region of the digital image. The line drawing is stylized to generate a personalized digital face chart. A user interface configured to accept at least one face chart modification from a user is provided. The personalized digital face chart is modified based on the at least one face chart modification.

22 Claims, 7 Drawing Sheets

(56) References Cited

U.S. PATENT DOCUMENTS

| | | | |
|---|---|---|---|
| 2003/0095701 A1* | 5/2003 | Shum et al. | 382/155 |
| 2003/0123754 A1* | 7/2003 | Toyama | 382/291 |
| 2003/0133599 A1* | 7/2003 | Tian et al. | 382/118 |
| 2003/0223622 A1* | 12/2003 | Simon et al. | 382/118 |
| 2004/0179233 A1* | 9/2004 | Vallomy | 358/1.15 |
| 2005/0100243 A1* | 5/2005 | Shum et al. | 382/276 |
| 2005/0212821 A1* | 9/2005 | Xu et al. | 345/647 |
| 2007/0242066 A1* | 10/2007 | Levy Rosenthal | 345/419 |
| 2008/0158230 A1* | 7/2008 | Sharma et al. | 345/473 |
| 2009/0153552 A1* | 6/2009 | Fidaleo et al. | 345/419 |
| 2009/0204501 A1* | 8/2009 | Chen | 705/14 |
| 2010/0288295 A1* | 11/2010 | Kamada et al. | 132/200 |
| 2011/0284019 A1* | 11/2011 | Fairweather | 132/200 |
| 2012/0027269 A1* | 2/2012 | Fidaleo et al. | 382/118 |

* cited by examiner

SYSTEM AND METHOD FOR PROVIDING AND MODIFYING A PERSONALIZED FACE CHART

The present application is a continuation-in-part of U.S. patent application Ser. No. 12/784,797, filed on May 21, 2010, which is herein incorporated by reference for completeness of disclosure.

BACKGROUND OF THE INVENTION

1. Field of the Invention

Embodiments of the invention described herein pertain to the field of computer systems. More particularly, but not by way of limitation, one or more embodiments of the invention enable systems and methods for providing and modifying a personalized face chart.

2. Description of the Related Art

Face charts are an interactive marketing and educational tool. Face charts are a representation of a face that is printed on special paper. The absorbency, thickness, material and texture of the paper is designed to adhere makeup and other beauty products applied directly to the face chart. To highlight the characteristics of the makeup applied to the paper, the representation of the face is typically a line drawing with minimal shading effects.

Face charts include space to fill in instructional information for applying products to specific facial features to achieve the specific effect of the makeup that is physically applied to the face chart. The instructional information is manually entered on the face chart, such as by a sales person acting as a beauty expert.

A face chart is typically stylized to appeal to target consumers of a specific brand, retailer, manufacturer or a line of beauty products. For example, each manufacturer or line of beauty products may use a drawing of a face designed by an artist to represent the manufacturer or line. The single design is printed on paper designed to adhere makeup. The pre-printed generic face chart is then distributed to retail outlets. The retail outlets use the generic face charts as an interactive marketing and educational tool. Makeup and other beauty products from open display packages may be applied directly to the face chart by a consumer or a beauty expert promoting the products. Instructional notes for application of the beauty product may be written directly on the face chart. More than one beauty product may be applied to a face chart.

After a beauty expert completes a customer's makeover, the face chart is a device for recording the products and step-by-step procedures for recreating that makeover. The products include, but are not limited to skin care products, wrinkle creams, eye creams, foundation, concealer, corrector, face powder, bronzer, blush, rouge, lip stick, lip gloss, lip liner, eye shadow, eye liner, mascara, eyebrow pencil, piercings, ear rings, necklaces, barrettes and hats. The face chart may be given to the customer to bring home in order to recreate the makeover at home. A copy of the face chart may be retained at the store as a record of the makeover so that beauty expert can recreate the makeover or replenish the products used in creating the makeover.

The single-design face chart for each manufacturer and/or line of beauty products is a one size fits all solution. Even though a target consumer may have a different facial shape or different facial features, a customized face chart is not available to the target consumer.

To overcome the problems and limitations described above there is a need for a system and method for providing and modifying a personalized face chart.

BRIEF SUMMARY OF THE INVENTION

One or more embodiments of systems and methods for providing a personalized face chart enable a computer-implemented method for providing a personalized face chart. A digital image of a subject's face is obtained. A facial region of the digital image is identified. A line drawing based on at least the facial region of the digital image is generated. The line drawing may be generated using one or more image processing algorithms. The line drawing may also be generated using one or more feature selection algorithms.

The line drawing is stylized to generate a personalized digital face chart that includes the stylized line drawing. In one or more embodiments, the stylized line drawing is generated based on one or more style parameters, such as a facial shape setting, a facial angle setting, a hairstyle setting, a line texture setting, a line style setting, a facial feature setting, and a shading setting. The at least one style parameter may beautify the line drawing. The at least one style parameter may also improve a facial feature symmetry of the line drawing. The at least one style parameter may also remove one or more aging features of the line drawing. The at least one style parameter may also remove one or more skin imperfections of the line drawing. The stylized line drawing may be generated using one or more image processing algorithms. The stylized line drawing may also be generated using one or more feature selection algorithms.

In one or more embodiments, the at least one style parameter is selected based on a demographic to which the subject belongs. The at least one style parameter may be selected based on at least one target demographic of at least one product line as determined by a marketer of the at least one product line.

The computer-implemented method may further include communicating with a printing device located at a retailer location. The retail location may provide at least one open package of one or more beauty products to apply to a printed face chart generated using the printing device. The printing device is configured to print a personalized face chart based on the personalized digital face chart on specialized paper for application of the one or more beauty products.

One or more embodiments of the systems and methods for providing a personalized face chart enable a computer-implemented method for providing a personalized face chart. A digital image of a subject's face is obtained. A facial region of the digital image is identified. A personalized face chart including a line drawing based on the digital image is generated. The personalized digital face chart may include a text area with one or more facial feature text labels. The personalized digital face chart may include a text area with product information. The personalized digital face chart may include a text area with product application instructions for applying at least one effect to said subject. The line drawing may be generated using one or more image processing algorithms. The line drawing may also be generated using one or more feature selection algorithms configured to identify a best match for a feature from a set of pre-designed line drawings of the feature. The line drawing may be stylized based on at least one style parameter.

One or more facial features of the personalized digital face chart is identified. At least one effect is digitally applied to at least one facial feature of the personalized digital face chart to simulate the application of at least one applied product to at least one facial feature of the subject. In one or more embodiments, digitally applying the at least one effect includes digitally applying an entire look, where the at least one product includes a set of products for achieving the entire look.

The computer-implemented method may further include generating at least one playable digital media file including a time-lapse application of the at least one effect to the personalized digital face chart. The at least one playable digital media file may include at least one of audio instructions and displayed text instructions for applying the beauty product to achieve the at least one effect on the subject.

The computer-implemented method may further include generating a makeover image based on the digital image by applying the at least one effect to the digital image in a photo realistic manner. The personalized digital face chart may further include an image display area including at least one of the digital image and the makeover image.

The computer-implemented method may further include providing a virtual makeover user interface enabling a user to select and apply the at least one effect to the digital image. The personalized digital face chart may include a list of products corresponding to the at least one effect used in the virtual makeover on the digital image.

One or more embodiments of the systems and methods for providing a personalized face chart enable system for providing a personalized face chart. The system includes at least one image capture device. The system further includes a computer system configured to generate a personalized digital face chart. The computer system includes a computer-readable medium encoded with computer-readable instructions. The system further includes an image capture communication interface coupled with the at least one image capture device and the computer system, where the computer system obtains a digital image over the image capture communication interface. The image capture communication interface may include a wired and/or wireless connection.

The computer-readable instructions include obtaining a digital image of a subject's face from the at least one image capture device. The computer-readable instructions further include identifying a facial region of the digital image. The computer-readable instructions further include generating a personalized digital face chart including a line drawing based on the digital image. In one or more embodiments, the personalized digital face chart includes a stylized line drawing.

In one or more embodiments, the system further includes a printing device and a printing communication interface coupled with the printing device and the computer system, and the computer-readable instructions further include printing the personalized digital face chart to the printing device over the printing communication interface to generate a printed personalized face chart. The image capture communication interface may include a wired and/or wireless connection. The printing device may be located at a retailer location. The printed personalized face chart may be printed on specialized paper designed to adhere one or more beauty products, including makeup. The retailer location may provide at least one open package of the one or more beauty products. In one or more embodiments, the system is provided as an automated vending machine unit configured to deliver the printed personalized face chart to a customer. The system may also deliver the personalized face chart via e-mail, MMS, a tangible computer readable medium, a social networking communication medium, a website, or any other method for transmitting digital data.

In one or more embodiments, the computer system further includes stored effects stored in a computer-readable medium, where each stored effect simulates the application of at least one product. The computer-readable instructions may further include providing an effect application user interface to apply at least one of the stored effects to the personalized digital face chart. The effect application user interface may include a touch screen interface.

The computer system may further include a computer database configured to store personalized digital face chart information for a plurality of subjects.

One or more embodiments of systems and method for providing a personalized digital face chart enable a computer-implemented method for providing a personalized digital face chart. A line drawing including at least one facial feature is obtained, where the line drawing includes at least a portion of a facial outline.

At least one facial feature response to at least one facial feature question is obtained. At least one facial feature parameter is determined based on the at least one facial feature response.

At least one facial shape response to at least one facial shape question is obtained. At least one facial shape parameter is determined based on the at least one facial shape response.

At least one style parameter is obtained. The at least one style parameter may include, for example, a facial angle setting, a hairstyle setting, a line texture setting, a line style setting, a shading setting, and any other stylistic parameter of a facial line drawing. The at least one style parameter may beautify the line drawing. The at least one style parameter may improve a facial feature symmetry of the line drawing. The at least one style parameter may also remove one or more aging features of the line drawing. The at least one style parameter may also remove one or more imperfections of the line drawing. In one or more embodiments, the at least one style parameter is selected based on a target demographic to which the subject belongs. The at least one style parameter may be selected based on at least one target demographic of at least one product line.

At least one facial feature of the line drawing is modified based on the at least one facial feature parameter. At least a portion of the facial outline is modified based on the at least one facial shape parameter. The line drawing is modified based on the at least one style parameter one or more embodiments of systems and methods for providing a personalized face chart enable a computer-implemented method for providing a personalized face chart.

In one or more embodiments, the computer-implemented method includes the step of obtaining a digital image of a subject's face.

In one or more embodiments, the computer-implemented method includes the step of identifying a facial region of the digital image from a background region of the digital image.

In one or more embodiments, the computer-implemented method includes the step of generating a line drawing based on at least the facial region of the digital image.

In one or more embodiments, the computer-implemented method includes the step of stylizing the line drawing to generate a personalized digital face chart.

In one or more embodiments, the computer-implemented method includes the step of configuring a user interface to accept at least one face chart modification from a user is provided. The user may be the subject. In one or more embodiments, the user is a beauty expert.

In one or more embodiments, the computer-implemented method includes the step of modifying the personalized digital face chart based on the at least one face chart modification.

In one or more embodiments, the at least one face chart modification includes manually choosing a feature style for a selected feature characteristic from a selection of feature styles. The selected feature characteristic may include an eye shape. In one or more embodiments, the selected feature characteristic includes an eye crease.

In one or more embodiments, the user interface includes at least one slider associated with a parameter of the personalized digital face chart, where the at least one face chart modification includes a change in position in the at least one slider affecting the parameter.

In one or more embodiments, the user interface includes at least one slider associated with a degree of stylization of the personalized digital face chart, where the at least one face chart modification includes a change in the degree of stylization.

In one or more embodiments, generating the line drawing based on the at least one facial region includes generating a line drawing of a hair area of the subject by obtaining at least one foreground selection including the hair area of the subject in the digital image, obtaining at least one background selection excluding the hair area of the subject in the digital image, determining a calculated hair area of the digital image, where the calculated hair area is determined based on the foreground selection and the background selection, and generating a line drawing of the hair area based on the calculated hair area. The digital image of the subject may be taken with the subject in front of a monochromatic backdrop, where the background selection is determined using at least one chromakeying technique.

In one or more embodiments, the computer-implemented method further includes the step of evaluating a hair area of the digital image for the presence of at least one hairstyle feature, where generating the line drawing includes rendering at least one curve associated with the hair area, where the at least one curve includes at least one curve discontinuity associated with the at least one hairstyle feature. The at least one hairstyle feature may be selected from the group consisting of a hairline shape, a widows peak, and a part.

In one or more embodiments, the digital image is obtained using an imaging device including a photographic flash placed above the imaging device, and where the identifying the facial region includes determining a chin location based on a defined shadow in the digital image.

In one or more embodiments, the computer-implemented method further includes the step of obtaining three-dimensional data of the subject obtained with at least one three-dimensional imaging device, where the three-dimensional data of the subject is used to identify the facial region of the digital image from the background region of the digital image.

In one or more embodiments, the at least one face chart modification includes an omission of one or more omitted features.

In one or more embodiments, the computer-implemented method further includes the step of generating a plurality of control points associated with at last one facial feature of the subject. The line drawing may be generated based on the plurality of control points. User interface 700 may include a display area showing the plurality of control points. The at least one face chart modification may include adding, moving or removing one or more of the plurality of control points to modify the line drawing.

In one or more embodiments, the computer-implemented method further includes the steps of obtaining an infrared image of the subject illuminated by an infrared illuminant source, and determining an eye position of the subject in the digital image based on infrared intensity in the infrared image. The eye position may be is used to identify the facial region of the digital image from the background region of the digital image.

In one or more embodiments, stylizing the at least one face chart includes modifying a facial expression of the subject. The at least one face chart modification may include manually selecting a facial expression.

In one or more embodiments, the computer-implemented method further includes the step of colorizing the personalized digital face chart based on one or more colors in the digital image, where the at least one face chart modification includes changing a coloring of the personalized digital face chart.

In one or more embodiments, the computer-implemented method further includes the step of storing an intermediate representation of the personalized digital face chart capable of generating a plurality of digital face chart versions using the user interface.

In one or more embodiments, the user interface is configured to display a plurality of products in response to user input associated with the personalized digital face chart.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for providing a personalized face chart will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
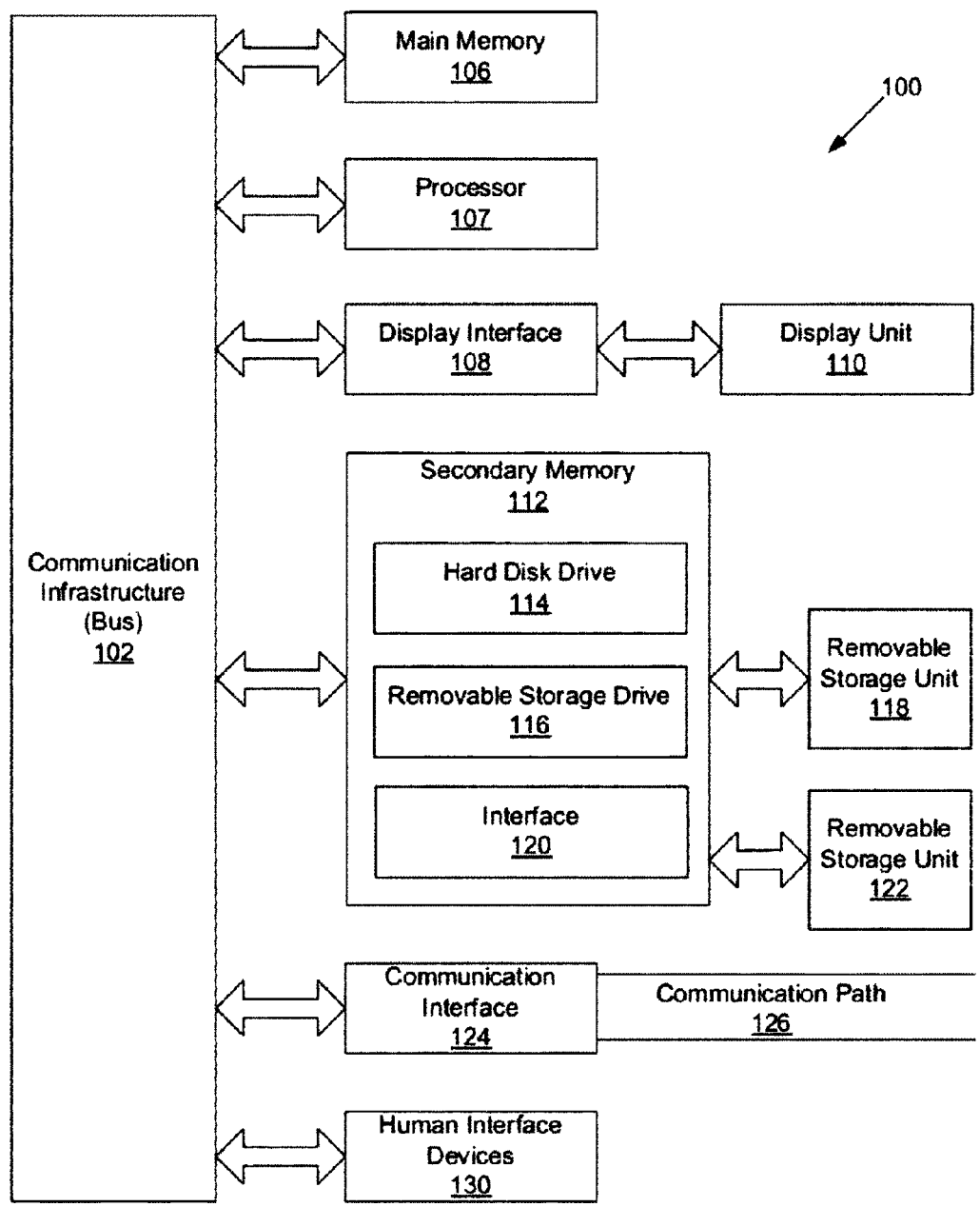
FIG. 1 illustrates a general-purpose computer and peripherals that when programmed as described herein may operate as a specially programmed computer capable of implementing one or more methods, apparatus and/or systems of the solution.

FIG. 1 diagrams a system 100 comprising a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially programmed computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

FIG. 1 illustrates a general-purpose computer and peripherals that when programmed as described herein may operate as a specially programmed computer capable of implementing one or more methods, apparatus and/or systems of the solution.

Figure 2:
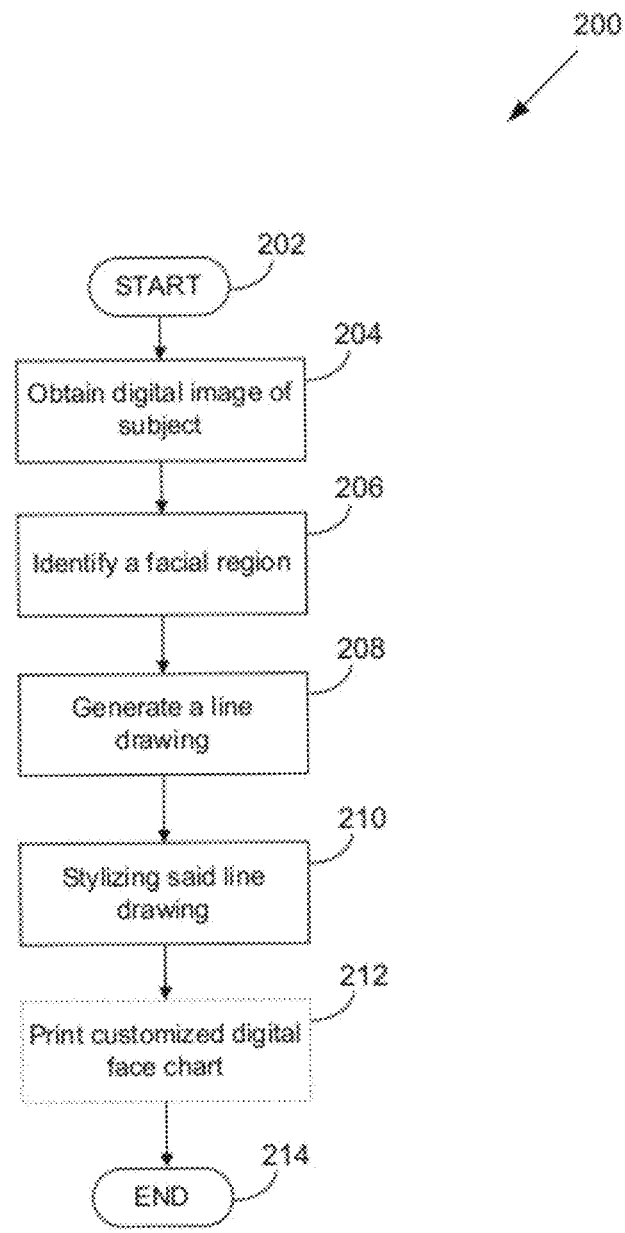
FIG. 2 is a flowchart showing exemplary process steps in accordance with systems and methods for providing and modifying a personalized face chart.

FIG. 2 is a flowchart showing exemplary process steps in accordance with systems and methods for providing a personalized face chart. Process 200 starts at step 202. Processing continues to step 204, where a digital image of the face of a subject is obtained. The digital image of the subject may be any digital representation of the subject including a facial region of the subject.

The digital image of the subject may be obtained from a camera, a scanner, a computer-readable medium, a network, the Internet, a virtual makeover system, a social network communication medium, or any other source capable of providing a digital image. In one or more embodiments, the digital representation includes three-dimensional information. The three-dimensional information may be used to identify a facial region of the subject in the digital image from the background region of the digital image. The three-dimensional information may be obtained by using algorithms, heuristics and other techniques on one or more images. In one or more embodiments, the digital image of the subject is taken in front of a monochromatic backdrop. The background selection is determined using at least one chromakeying technique on the digital image.

Processing continues to step 206, where a facial region of the digital image is identified. In one or more embodiments, at least one chromakeying technique is used to identify the facial region of the digital image.

Processing continues to step 208, where a line drawing is generated. The line drawing is generated based on at least the facial region of the digital image. In one or more embodiments, generating the line drawing includes generating a line drawing of a hair area of the subject. In one or more embodiments, the line drawing of the hair area of the subject is generated by obtaining at least one foreground selection in the digital image that includes the hair area of the subject, obtaining at least one background selection in the digital image that excludes the hair area of the subject, determining a calculated hair area of the digital image based on the foreground selection and the background selection, and generating a line drawing based on the calculated hair area.

In one or more embodiments, generating the line drawing further includes evaluating the hair area of the digital image for the presence of at least one hairstyle feature. At least one curve associated with the hair area may be rendered, where the curve includes at least one curve discontinuity be associated with the presence of the at least one hairstyle feature. In one or more embodiments, the at least one hairstyle feature includes a hairline, a widow's peak, a part, bangs, or any other hairstyle feature.

Processing continues to step 210, where the line drawing is stylized and a personalized digital face chart including the stylized line drawing is generated. Image processing techniques, including algorithms and heuristics, are used to generate the stylized line drawing. The line drawing may be stylized based on one or more style parameters, such as a facial shape setting, a facial angle setting, a hair style setting, a line texture setting, a line style setting, a facial feature setting, a shading setting, and any other style parameter that can be applied to a line drawing to modify a style. In one or more embodiments, a style parameter is defined by one or more algorithms, heuristics or other image processing techniques for achieving a specific style.

One or more embodiments apply a style parameter that beautifies the line drawing. A style parameter may also improve the facial symmetry of the line drawing, remove one or more aging features, or remove one or more imperfections, such as blemishes, wrinkles and any other undesirable feature in the line drawing generated from the digital image. In one or more embodiments, known methods for facial beautification are applied to the digital image of the subject before a line drawing is generated. Leyvand, et al., Data-Driven Enhancement of Facial Attractiveness SIGGRAPH Volume 27, Issue 3 (August 2008) disclosed as exemplary methods for facial beautification in a photographic facial image, and is hereby incorporated in its entirety.

Algorithms, heuristics or other image processing techniques may also be directly applied to the line drawing to achieve facial beautification. In one or more embodiments, anchor points corresponding to facial features in the line drawing are determined. Differences between anchor points may be calculated, and the line drawing may be warped to bring ratios closer to "ideal ratios." Pallett, et al., New "golden" ratios for facial beauty, Vision Res. 2010 January: 50(2):149-54 describes research identifying ratios which are found to be indicators of facial beauty, and is hereby incorporated in its entirety. Other algorithms, heuristics and image processing techniques may be applied to the line drawing and/or the digital image of the subject to beautify the line drawing without departing from the spirit and scope of the invention.

In one or more embodiments, a style parameter is selected based on a target demographic to which the subject of the digital image belongs. A target demographic may include one or more age groups, one or more subcultures, one or more socioeconomic levels, one or more ethnic groups, or any other groups a subject may associate with. Furthermore, a target demographic may be determined based on one or more characteristics of the digital image, such as a hair color, a skin tone, a skin texture, a skin type, a present facial feature characteristic, an absent facial feature characteristic, or any other characteristic of the digital image. In one or more embodiments, information about the subject may be provided by a user, and a style parameter is selected based on the user-provided information. Examples of user-provided information are preferences, tastes, self associations, and any other information that a style parameter can be based on.

In one or more embodiments, the style parameter is selected based on at least one target demographic of at least one product line. For example, if a manufacturer has multiple product lines marketed towards different demographics, a different set of style parameters may be applied to the line drawing to generate a customized digital face chart for a subject belonging to a specific demographic. A manufacturer, retailer, or any other entity may also choose to apply a set of style parameters to all customized face charts generated in association with the specific entity.

Processing continues to optional step 212, where a customized digital face chart is printed. The customized digital face chart may also be displayed, stored, e-mailed, saved or otherwise digitally handled. In one or more embodiments, the customized digital face chart is transmitted to a printing device located at a retailer location. The personalized digital face chart may be printed on specialized paper for the direct application of one or more beauty products, such as makeup. The retailer may provide at least one open package of one or more beauty products for direct application to the printed face chart. Processing continues to step 214, where process 200 terminates.

Figure 3:
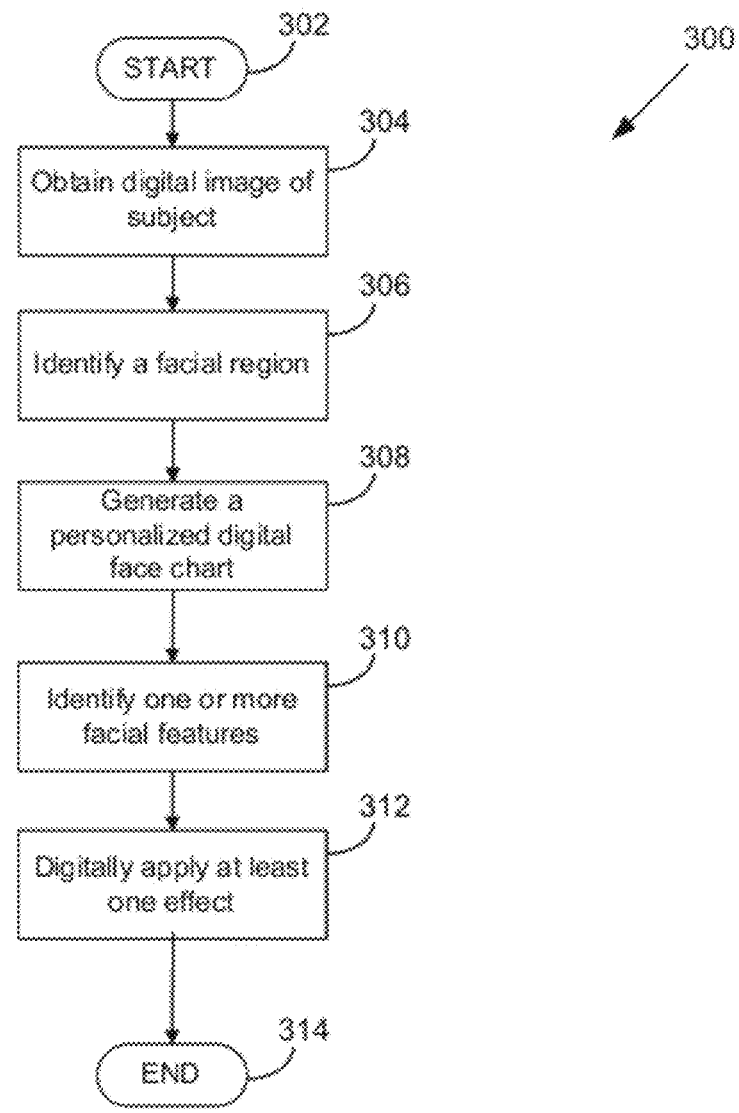
FIG. 3 is a flowchart showing exemplary process steps in accordance with systems and methods for providing and modifying a personalized face chart.

FIG. 3 is a flowchart showing exemplary process steps in accordance with systems and methods for providing a personalized face chart. Process 300 starts at step 302. Processing continues to step 304, where a digital image of a subject is obtained. In one or more embodiments, the digital representation includes three-dimensional information. The three-dimensional information may be obtained by using algorithms, heuristics and other techniques on one or more images. Processing continues to step 306, where a facial region of the digital image is identified. The digital image of the subject may be any digital representation of the subject including a facial region of the subject.

Processing continues to step 308, where a personalized digital face chart is generated. The personalized digital face chart includes the line drawing based on the digital image. Image processing techniques, including algorithms and heuristics, may be used to generate the line drawing from the digital image. A person of ordinary skill in the art would recognize that different image processing techniques, algorithms and heuristics may be used in accordance with systems and methods for providing a personalized digital face chart without departing from the spirit and the scope of the invention.

Commercial photo enhancement and manipulation programs such as Adobe Photoshop contain filters and operations that can be executed in sequence to create a line drawing and these steps can be included in an embodiment of the invention. Another method for creating a line drawing is to run an edge detector program over the region. One of the most widely used edge detectors is the Canny Edge Detector as described in Canny, J., A computational approach to edge detection, IEEE Transactions on Pattern Analysis and Machine Intelligence, PAMI-8(6), 679-698 (1986), which is hereby incorporated by reference in its entirety.

Bowyer et al., Edge detector evaluation using empirical ROC curves. Computer Vision and Image Understanding, 84(1), 77-103 (2001), which is hereby incorporated by reference in its entirety, provides a review and evaluation of alternative edge detection algorithms. An edge detection algorithm can output a binary image where a 1 indicates the presence of an edge and a 0 indicates lack of an edge. This bitmap can be displayed as a line drawing. Many edge detectors including the Canny Edge Detector also provide a list of linked edge elements (edgels), each of which forms a polyline. The polylines can be rendered as a line drawing using vector or raster graphics techniques.

Another method to create a line drawing of a region of an image containing a face is to fit a parameterized face model to the image. Two examples of such models and fitting procedures are Active Shape Models and Active Appearance Models (Cootes, et al., Active shape models—their training and application. Computer Vision and Image Understanding, 61(1), 38-59 (1995), and Cootes, et al., Active appearance models. IEEE Transactions on Pattern Analysis and Machine Intelligence, 23(6), 681-685, (2001) which are hereby incorporated by reference in their entirety). The output of these methods is a shape model that includes the locations and shapes of facial features including the eyes, iris, lips, nose, eye brows, chin, and jaw line. Once the model has been fit, it can be rendered as a line drawing. These methods detect the locations, size and shape of the face and facial features.

A line drawing can be created by merging the output of the edge detection processes with the output of the face shape model fitting process. One way to merge the outputs is to suppress detected edges that are not proximal to a facial feature. For example, spurious edges may occur on the cheeks and these are not proximal to the detected eyes, nose or mouth. Another way of merging the outputs is take a predefined set of components from each. For example, the detected edges whose locations are near the detected eyes and eyebrows are included in the line drawing as well as the line drawing from all detected facial features except the eyes and brows. So, the resulting line drawing would have more detail in the eye region but be more abstracted around the nose, mouth and chin.

Once the line drawing has been generated, the line drawing is stylized. There are many methods for stylizing the line drawing using techniques known to those of ordinary skill in the art. The drawing can be stylized with differing thicknesses and line styles (e.g. dashed), and different brush or pen strokes can be simulated. A person of ordinary skill in the art would recognize that different image processing techniques, algorithms and heuristics may be used in accordance with systems and methods for providing a personalized digital face chart without departing from the spirit and the scope of the invention.

The method of Curve Analogies is described in Hertzmann, et al., Curve Analogies, Thirteenth Eurographics Workshop on Rendering, (2002), which is hereby incorporated by reference in its entirety. The Curve Analogies method provides one technique for creating line drawings with differing styles. Different line styles may be used for different facial features where facial features have been detected.

Another method for stylizing a line drawing is to replace one or more facial features with a predefined stylized line drawing of that facial feature where the size, position, aspect ratio, and warping of the predefined stylized line drawing is determined by the parameters of fit facial features as well as the style parameters. For example, the nose may be replaced by a stylized line drawing of the nose, but the position, length and width of the stylized nose drawing is determined by the position, length and width of the detected nose.

The stylized line drawing might include the lines resulting from the detected edges of the subject's hair or it might not include any hair by excluding any detected edges that are far enough away from the detected facial features, or the hair might be replaced by a predefined hairstyle in the same manner as other facial features are replaced.

In one or more embodiments, the personalized digital face chart includes a text area. The text area may include one or more feature text labels identifying one or more facial features present on the line drawing of the personalized digital face chart. The text area may further include product information, including specific product information, product line information, brand information, and manufacturer information. The text area may further include instructions for applying one or more simulated effects on the subject using one or more products. The text area may present information in the form of a chart, a list, a table, and any other format for arranging text information. The text area may further include one or more blank areas for writing or otherwise adding information to the personal digital face chart. The blank areas may be designed to be filled and electronically or by hand. The text area may be on the same page as the line drawing or a separate page. In one or more embodiments, the text area spans multiple pages. The text area may also include drawings, illustrations, photographs, diagrams, or any other visual product information, including product application information.

In one or more embodiments, the line drawing of the personalized digital face chart is stylized. Image processing techniques, including algorithms and heuristics, are used to generate the stylized line drawing. The line drawing may be stylized based on one or more style parameters, such as a facial shape setting, a facial angle setting, a hair style setting, a line texture setting, a line style setting, a facial features setting, a shading setting, and any other style parameter that can be applied to a line drawing to modify a style. In one or more embodiments, a style parameter is defined by one or more algorithms, heuristics or other image processing techniques. A different image processing technique, algorithm or heuristic may be applied to different facial regions of the line drawing. In one or more embodiments, stylization is based on one or more parameters generated by evaluating a model line drawing. Other algorithms, heuristics and image processing techniques may be applied to the line drawing and/or the digital image of the subject to stylize the line drawing without departing from the spirit and scope of the invention.

One or more embodiments apply a style parameter that beautifies the line drawing. A style parameter may also improve the facial symmetry of the line drawing, remove one or more aging features, or remove one or more imperfections, such as blemishes, wrinkles and any other undesirable feature in the line drawing generated from the digital image.

A style parameter may be selected based on a target demographic to which the subject of the digital image belongs. A target demographic may include one or more age groups, one or more subcultures, one or more socioeconomic levels, one or more ethnic groups, or any other group a subject may associate with. Furthermore, a target demographic may be determined based on one or more characteristics of the digital image, such as a hair color, a skin tone, a skin texture, a skin type, a present facial feature characteristic, an absent facial feature characteristic, or any other feature of the digital image. In one or more embodiments, information about the subject may be provided by a user, and a style parameter is selected based on the user-provided information. Examples of user-provided information are preferences, tastes, self associations, and any other information that a style parameter can be based on.

In one or more embodiments, one or more style parameters are selected based on at least one target demographic of at least one product line. For example, if a manufacturer has multiple product lines marketed towards different demographics, a different set of style parameters may be applied to the line drawing to generate a customized digital face chart for each product line. A manufacturer, retailer, or any other entity may also choose to apply a set of style parameters to all line drawings for personalized digital face charges associated with that entity.

Processing continues to step 310, where one or more facial features of the personalized digital face chart are identified. One or more facial features may be identified using feature recognition algorithms, heuristics, and other image processing techniques. In one or more embodiments, initial facial feature location information may be provided by the user to help identify facial features of the digital image. The features may also be determined using techniques which evaluate the similarity and location of facial features in the digital image.

Processing continues to step 312, where at least one effect is digitally applied. The digitally applied effect simulates the application of at least one applied product to at least one facial feature. In one or more embodiments, the digitally applied effect simulates the application of a product on a surface, including a smooth or textured paper surface. The digitally applied effect may simulate the application of the product using a specific tool, such as a brush, sponge, finger, pack, Q-tip, or any other tool useful for the application of makeup. In one or more embodiments, an entire set of effects are applied to simulate applying an entire look to the subject. The entire look may be associated with a set of products for achieving the entire look on the subject.

The personalized digital face chart may include a text area with product information, such as product information corresponding to one or more products capable of producing the simulated effect on the subject. The text area may further include instructions for applying one or more simulated effects on the subject using one or more products. The text area may present information in the form of a chart, a list, a table, and any other format for arranging text information.

In one or more embodiments, a playable digital media file is generated that includes a time lapse application of the at least one effect to the personalized digital face chart. The playable digital media file may include audio instructions and/or displayed text instructions for applying the at least one effect to the subject. Processing continues to step 314, where process 300 terminates.

In one or more embodiments, a makeover image based on the original digital image is generated by applying the at least one effect to the original digital image in a realistic manner to produce the makeover image. At least one of the makeover image and the original digital image may be included in the personalized digital face chart. In one or more embodiments, a playable digital media file is generated that includes a time lapse application of the at least one effect to the digital image in a photorealistic manner.

Figure 4:
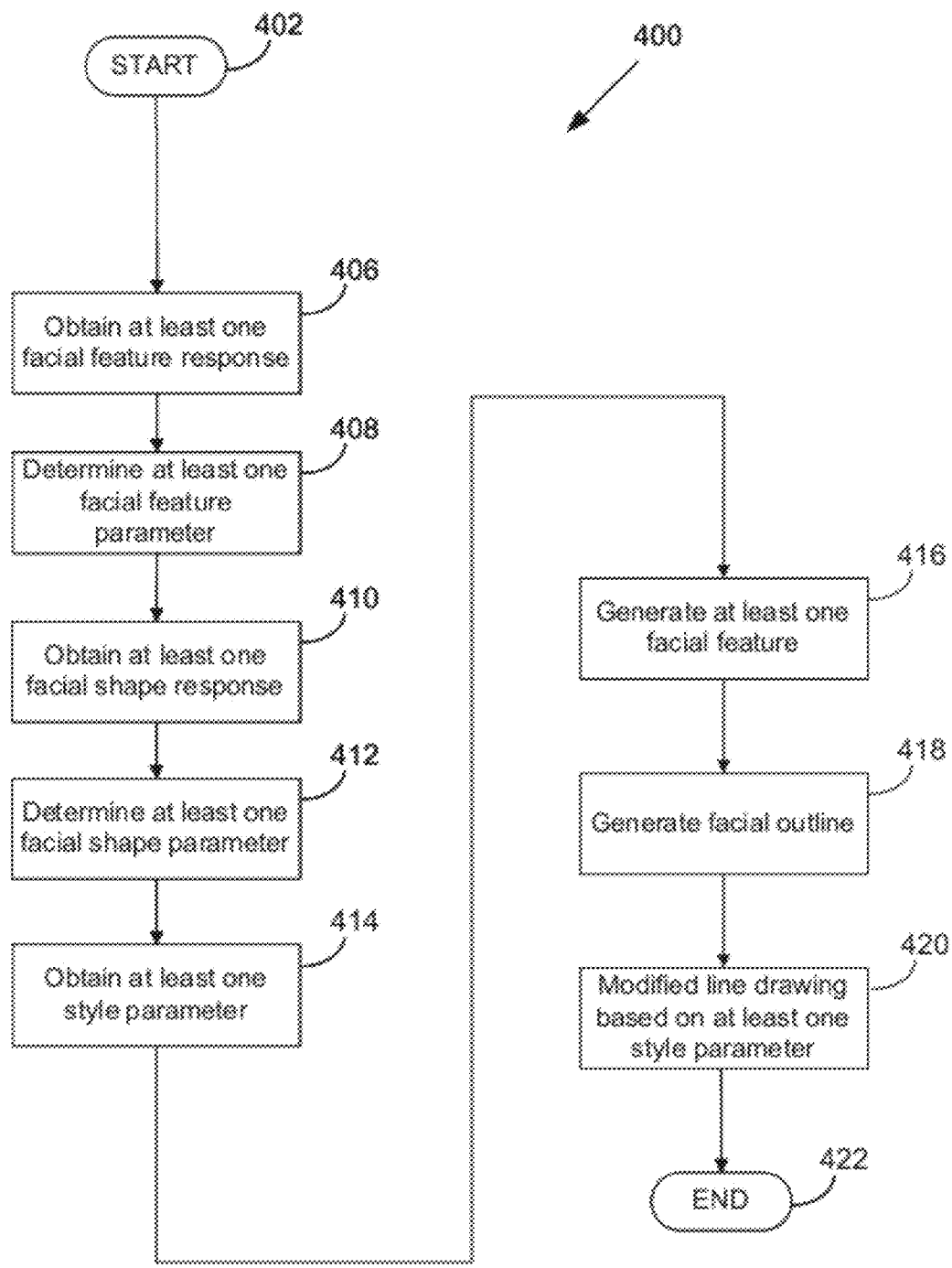
FIG. 4 is a flowchart showing exemplary process steps in accordance with systems and methods for providing and modifying a personalized face chart.

FIG. 4 is a flowchart showing exemplary process steps in accordance with systems and methods for providing a personalized face chart. Process 400 starts at step 402. Processing continues to step 406, where at least one facial feature response to at least one facial feature question is obtained. A facial feature question may be any question from which a facial feature characteristic may be determined. For example, a facial feature question may ask about a feature size, shape, distance, width, length, color, or any other characteristic. A facial feature question may also be directed to general facts which may provide information about a facial feature characteristic, such as a subject's age, weight, body type, ethnicity, or any other relevant general fact.

Processing continues to step 408, where at least one facial feature parameter is determined. A facial feature parameter may be determined based on facial feature responses directly related to a feature, such as a feature size, shape, distance, width, length, color or any other facial feature characteristic. A facial feature parameter may also be determined based on general facts, such as the subject's age, weight, body type, ethnicity, or any other relevant general fact about the subject.

Processing continues to step 410, where at least one facial shape response to at least one facial shape question is obtained. The facial shape question may be any question from which a facial shape may be determined. For example, a facial shape question may ask about a face shape, width, length, configuration, hairline, bone structure, or any other facial shape characteristic. A facial shape question may also be directed to general facts which may provide information about a facial shape, such as a subject's age, weight, body type, ethnicity, or any other relevant general fact.

Processing continues to step 412, where at least one facial shape parameter is determined. A facial shape parameter may be determined based on facial shape responses directly related to facial shape, such as a face shape, width, length, configuration, hairline, bone structure, or any other facial shape characteristic. A facial shape parameter may also be determined based on general facts, such as the subject's age, weight, body type, ethnicity, or any other relevant general fact about the subject.

Processing continues to step 414, where at least one style parameter is obtained. The style parameter may be supplied directly by a user or determined based on information supplied by the user. The style parameter may also be obtained from a computer system, such as from computer-readable instructions. In one or more embodiments, at least one style parameter is encoded in computer-readable instructions. For example, computer-readable instructions that are tailored to a manufacturer, retailer, product line, or other entity may encode instructions for applying at least one preselected style parameter.

Processing continues to step 416, where at least one facial feature of a line drawing is generated based on the at least one facial feature parameter. In one or more embodiments, a generic facial feature is modified based on one or more facial feature parameters. A facial feature graphic component may also be generated based on one or more facial feature parameters. The facial features are combined to generate a single line drawing for the personalized face chart.

Processing continues to step 418, where a facial outline of the line drawing is modified based on the at least one facial shape parameter. In embodiments, a generic facial outline is modified based on one or more facial shape parameters. A facial outline graphic component may also be generated based on one or more facial shape parameters. The facial outline is added to the line drawing of the personalized face chart.

Processing continues to step 420, where the line drawing is modified based on at least one style parameter. Style parameters may include a facial shape setting, a facial angle setting, a hair style setting, a line texture setting, a line style setting, a facial features setting, a shading setting, and any other style parameter that can be applied to a line drawing to modify a style, a beautification setting, a symmetry setting, an age setting, an imperfection tolerance setting, a target demographic, a taste preference, a product line, manufacturer, retailer, or any other setting that describes a style effect. A style parameter may be applied to modify the line drawing by the use of an algorithm, heuristic, or any other technique. Processing continues to step 422, where process 400 terminates.

Figure 5:
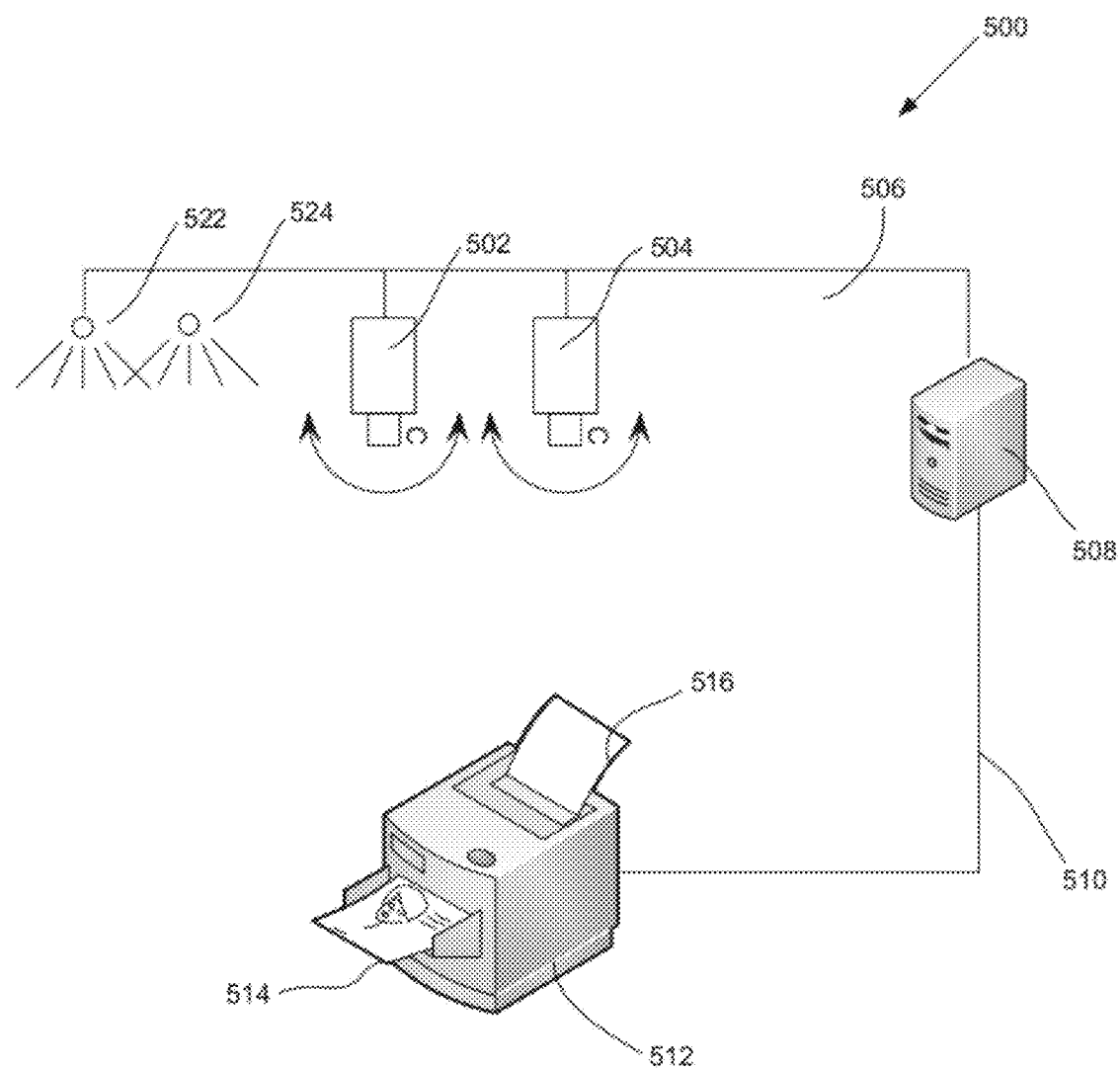
FIG. 5 illustrates an exemplary system in accordance with systems and methods for providing and modifying a personalized face chart.

FIG. 5 illustrates an exemplary system in accordance with systems and methods for providing a personalized face chart. System 500 includes one or more image capture devices 502-504. Image capture devices 502-504 may include digital cameras, optical scanners, video cameras, and any other device capable of generating a digital image. Image capture devices 502-504 are configured to obtain at least one digital image of the subject including a facial region. System 500 may further include one or more light sources 522-524, such as a constant light source, photographic flash, an infrared illuminant source, or any other light source. In one or more embodiments, light sources 522-524 are communicatively coupled with at least one of image capture devices 502-504, computer system 580, or any other component of system 500.

In one or more embodiments, the one or more light sources 522-524 includes at least one photographic flash placed above at least one of image capture devices 502-504. The at least one image capture device may be configured to obtain a digital image, where a facial region of a subject in the digital image is identifiable by determining a chin location based on a defined shadow. The shadow in the digital image is enhanced by the placement of the photographic flash relative to the image capture device.

In one or more embodiments, the one or more light sources 522-524 includes at least one infrared illuminant source, and at least one of image capture devices 502-504 is configured to obtain an infrared image of a subject illuminated by the at least one infrared illuminant source. In one or more embodiments, an eye position of the subject in a corresponding digital image is determined based on infrared intensity in the infrared image. The eye position may be used to identify the facial region of the subject in the digital image from the background region of the digital image.

System 500 also includes computer system 508. Computer system 508 is any system capable of performing the computer-implemented method outlined by FIGS. 2-4, including system 100. For example, computer system 508 may be a desktop computer, a server computer, a web-enabled computer system, a laptop computer, a mobile phone, a smart phone, a net book, any other mobile computing device, and any other computing system. Computer system 508 may include a touch screen interface. Computer system 508 is configured to generate a personalized digital face chart. For example, computer system 508 may include a computer-readable medium encoded with computer-readable instructions to obtain a digital image of a subject's face from at least one image capture device 502-504, identify the facial region of the digital image, and generate a personalized digital face chart that includes a line drawing based on the digital image. The line drawing may be stylized. For example, the process illustrated in FIG. 2 is capable of stylizing a line drawing based on a digital image. Computer system 508 may include a computer database configured to store personalized digital face chart information for a plurality of subjects.

System 500 also includes face chart printer 512. Face chart printer 512 is any printing device capable of reproducing a customized digital face chart on physical medium. For example, face chart printer 512 generates printed face chart 514 by printing a digital face chart on paper 516. The paper may be specialized paper configured with an absorbency, thickness, and texture to adhere makeup or any other beauty product applied directly to the face chart. In one or more embodiments, the hue of paper 516 is selected to complement one or more beauty products when applied to paper 516. The ink of face chart printer 512 may also be tailored for printing on paper 516. Including any specialized paper.

System 500 also includes image capture communication interface 506. Image capture communication interface 506 may include one or more communication components, such as a communication infrastructure system bus, a wired connection, a wireless connection, a wired network, a wireless network, a cellular network, and any other communication network.

System 500 also includes printing communication interface 510. Printing communication interface 510 may include one or more communication components, such as a communication infrastructure system bus, a wired connection, a wireless connection, a wired network, a wireless network, a cellular network, and any other communication network.

In one or more embodiments, the customized digital face chart is transmitted to a face chart printer 512 located at a retailer location. The retailer may provide at least one open package of one or more beauty products for application directly to the printed face chart.

Computer system 508 may further include one or more stored effects stored in a computer-readable medium, where each stored effect simulates the application of at least one product to a personalized digital face chart. For example, the process illustrated in FIG. 3 is capable of applying stored effects to simulate the application of at least one product to a personalized digital face chart. In one or more embodiments, the personalized digital face chart is printed with the applied stored effects simulating the application of at least one product. The system may be configured to deliver the personalized face chart with the applied stored effects via e-mail, MMS, a tangible computer readable medium, a social networking communication medium, a website, or any other method for transmitting digital data.

In one or more embodiments, computer system 508 is configured to simulate the application of at least one product to a generic digital face chart. The generic digital face chart with the simulated application of at least one product may be provided to a user, such as by printing. In one or more embodiments, the system is provided as an automated vending machine unit configured to deliver the printed personalized face chart to a customer. The system may also deliver the personalized face chart via e-mail, MMS, a tangible computer readable medium, a social networking communication medium, a website, or any other method for transmitting digital data.

In one or more embodiments, image capture devices 502-504 are replaced with an information gathering interface that obtains at least one facial feature response, at least one facial shape response, and at least one style parameter. For example, the process illustrated in FIG. 4 is capable of generating a personalized digital face chart without the use of image capture devices 502-504. In one or more embodiments, system 500 includes both at least one image capture device 502-504 and an information gathering interface.

Figure 6:
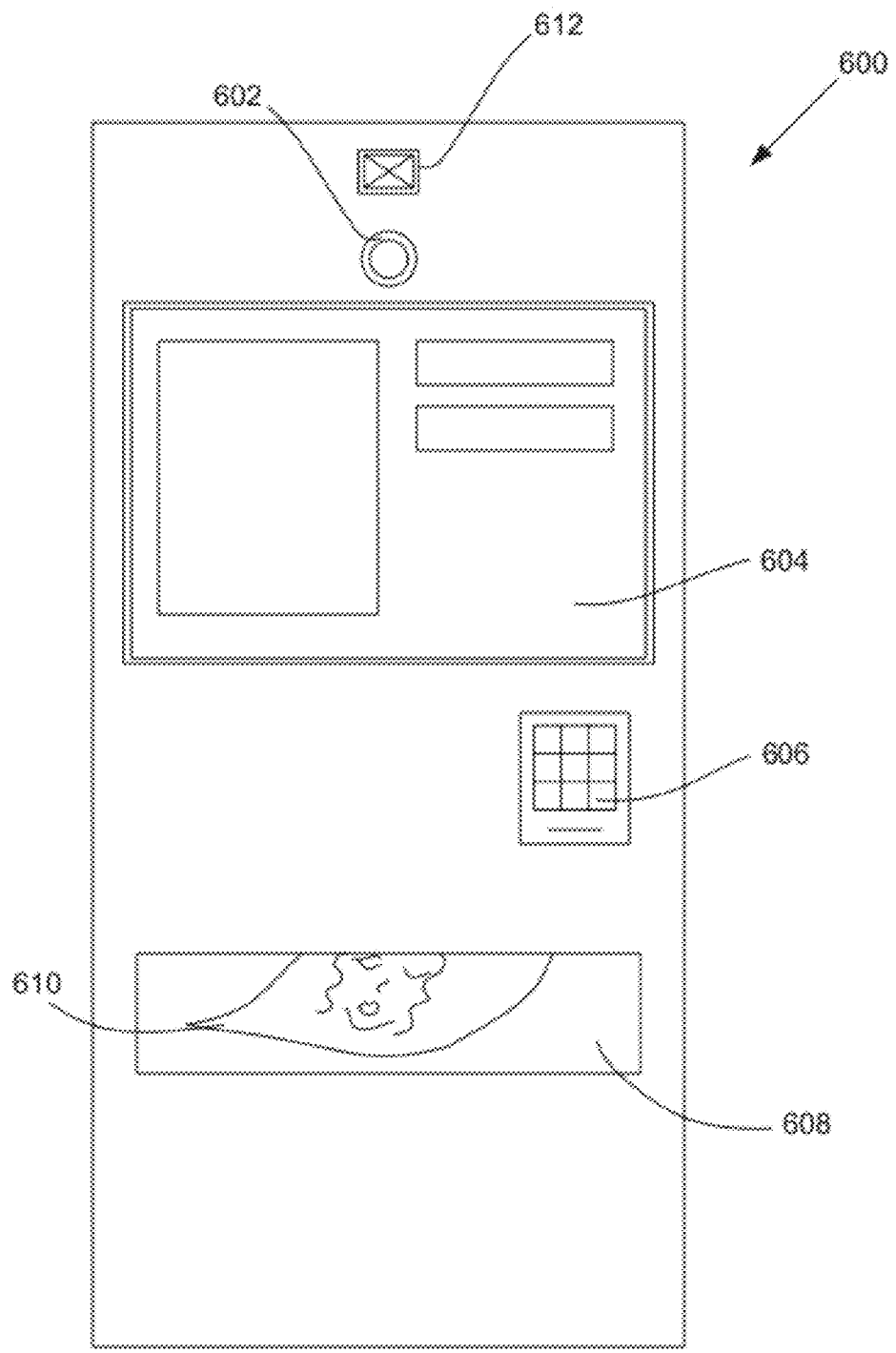
FIG. 6 illustrates an exemplary system in accordance with systems and methods for providing and modifying a personalized face chart.

FIG. 6 illustrates an exemplary system in accordance with systems and methods for providing a personalized face chart. Face chart unit system 600 is an all-in-one unit for providing personalized face charts. Face chart unit system 600 may include the elements shown and described with reference to system 500. Face chart unit system 600 may be located at a retailer location. The retailer may provide at least one open package of one or more beauty products for application directly to a printed face chart generated by face chart unit system 600.

Face chart unit system 600 includes image capture device 602. Image capture device 602 is configured to obtain a digital image including a facial region of a subject. Alternatively, face chart unit system 600 is replaced with an information gathering interface that obtains at least one facial feature response, at least one facial shape response, and at least one style parameter response. In one or more embodiments, face chart unit system 600 includes both at least one image capture device 602 and an information gathering interface.

Face chart unit system 600 further includes display 604. Display 604 is configured to display information to a user of face chart unit system 600. For example, face chart unit system 600 may be configured to display any one of one or more digital images obtained from image capture device 602, questions about a subject, payment information, personalized face chart preview information, and any other information used or generated in systems and methods for providing a personalized face chart.

Display 604 may be a touch screen interface capable of providing a user interface for the user to interact with face chart unit system 600. In one or more embodiments, display 604 provides a user interface for a virtual makeover using one or more simulated makeover effects, and face chart unit system 600 is further configured to generate a personalized face chart corresponding to the virtual makeover. U.S. patent application Ser. No. 12/406,063 entitled Method of Monetizing Online Personal Beauty Product Selections, filed Mar. 17, 2009, describes methods for providing a virtual makeover, and is hereby incorporated by reference in its entirety. The personalized face chart corresponding to the virtual makeover may include product information for at least one product applied in the virtual makeover, such as product name, line, manufacture, brand, color, SKU, application instructions, or any other product information. One or more stored effects corresponding to one or more products used in the virtual makeover may be applied to the personalized face chart.

Face chart unit system 600 optionally includes authorization interface 606. Authorization interface 606 may include a secure banking terminal configured to access secure banking services to process credit card, ATM, and other electronic transactions. Authorization interface 606 may be configured to receive cash payments. In one or more embodiments, authorization interface 606 is configured to authorize an authorized representative to use face chart unit system 600.

Face chart unit system further includes printing device 608. Printing device 608 is configured to generate a printed customized face chart 610. Printed customized face chart 610 may be printed on specialized paper configured with an absorbency, thickness, and texture to adhere makeup or any other beauty product applied directly to the paper's surface.

Figure 7:
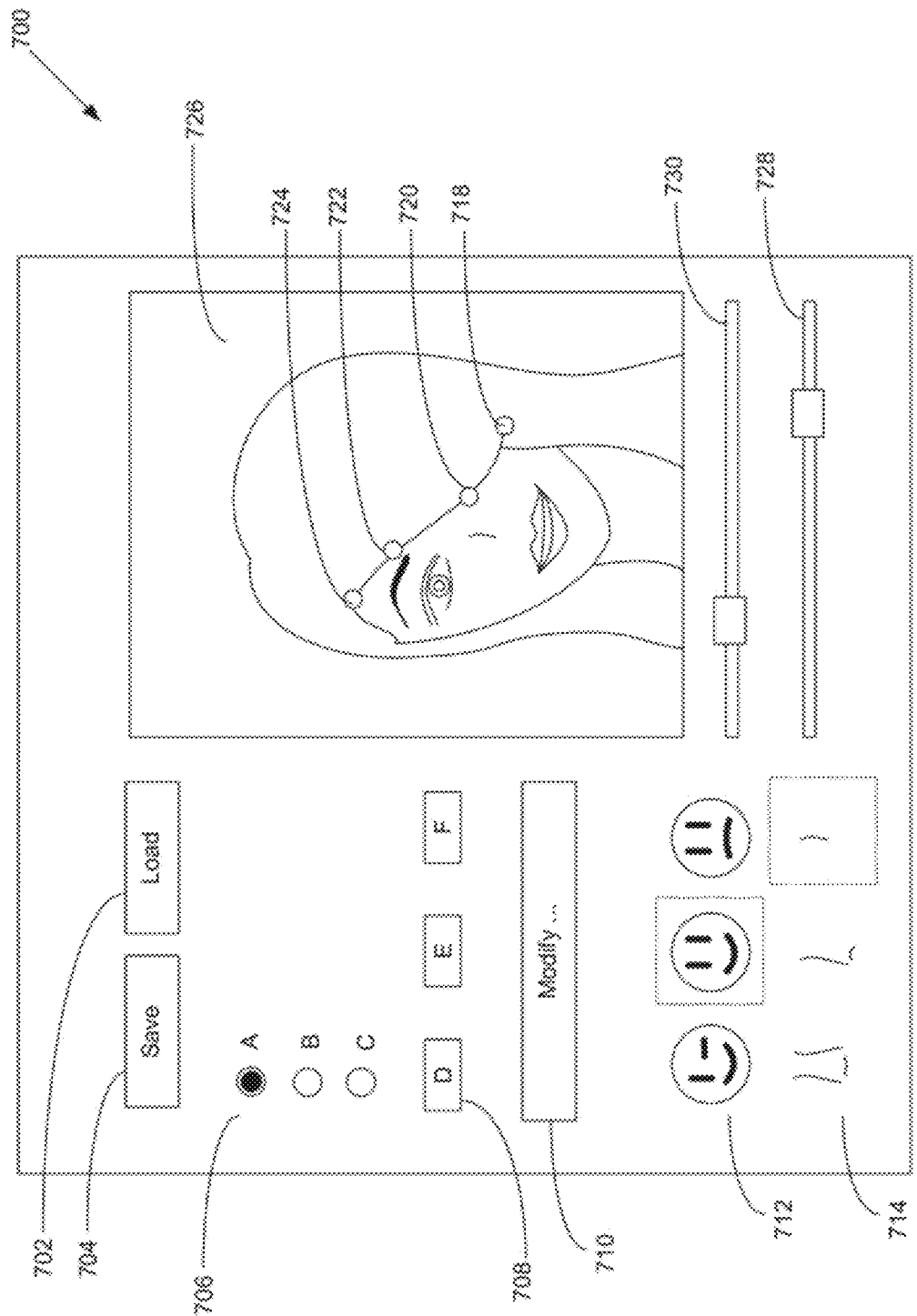
FIG. 7 illustrates an exemplary system in accordance with systems and methods for providing a personalized face chart.

FIG. 7 illustrates an exemplary system in accordance with systems and methods for providing a personalized face chart. In one or more embodiments of systems and methods for providing and modifying a personalized digital face chart, a user interface 700 is provided. User interface 700 is configured to accept at least one face chart modification from a user. The personalized digital face chart is modified based on the at least one face chart modification. The user may be the subject of a digital image from which the personalized digital face chart is generated. In one or more embodiments, the user is a third party, such as a professional, a cosmetologist, a beauty expert, an employee, a salesperson, a representative, or any other third party.

One or more embodiments of user interface 700 is configured to store an intermediate representation of the personalized digital face chart. The intermediate representation of the personalized digital face chart may be capable of generating a plurality of digital face chart version using user interface 700. The intermediate representation of the personalized digital face chart may include any set of data from which a personalized digital face chart may be generated. For example, user interface 700 may include one or more components 702 configured to load a saved intermediate representation of the personalized digital face chart. User interface 700 may further include one or more components 704 configured to save an intermediate representation of the personalized digital face chart or said any current modified representation of the personalized digital face chart that includes one or more modifications accepted by user interface 700.

In one or more embodiments, user interface 700 includes a visual representation of personalized digital face chart 726. User interface 700 may be further configured to display a modified version of personalized digital face chart 726 based on one or more modifications accepted.

In one or more embodiments, user interface 700 includes one or more components 706-708 configured to accept one or more modifications that include manually choosing a feature style for a selected feature characteristic from a selection of features files. Personalized digital face chart 726 may be modified based on one or more modifications entered by a user via components 706-708. In one or more embodiments, selected feature characteristics may include an eye shape. Other selected feature characteristics may include a hairline, a hairstyle feature, an eyebrow shape, the nose shape, a lip shape, feature size, a facial expression, or any other facial feature or any other characteristic of personalized digital face chart 726.

In one or more embodiments, user interface 700 includes one or more components 712 configured to accept one or more modifications that include modifying a facial expression of the subject. For example, components 712 may allow the user to manually select a facial expressions from a predetermined set of facial expressions.

In one or more embodiments, user interface 700 is further configured to accept one or more modifications that include changing a coloring of the personalized digital face chart. For example, the coloring may include standard image processing coloring schemes, as well as coloring schemes selected by a professional, a beauty expert, a cosmetologist, or any other expert. In one or more embodiments, one or more colorings corresponds to one or more sets of beauty products coordinated by color.

In one or more embodiments, user interface 700 is further configured to accept one or more modifications that include omitting one or more omitted features. User interface 700 may include one or more components 714 configured to accept one or more modifications that include modifying a facial feature, where the modifications include showing or omitting one or more features in whole or in part. In one or more embodiments, user interface 700 is configured to accept one or more modifications that include showing or omitting an eye crease.

Components 702-714 may include any user interface components, including but not limited to graphical user interface elements such as windows, buttons, sliders, menus, radio buttons, scrollbars, checkboxes, icons, or any other graphical user interface element or combination thereof. Components 702-714 may be used to accept one or more modifications that are discrete and/or continuous.

In one or more embodiments, modifications are immediately displayed in user interface 700, such as in the representation of personalized digital face chart 726. In one or more embodiments, modifications are not displayed until one or more user interface components, such as components 710.

In one or more embodiments, user interface 700 further includes a display area showing a plurality of control points 718-724. For example, the plurality of control points 718-724 may be displayed over a representation of personalized digital face chart 726. User interface 780 configured to accept one or more modifications that include adding, moving or removing one or more of control points 718-724. Control points 718-

724 may be associated with at least one facial feature of the subject, such as at least a portion of a hair line, a hairstyle feature, a chin line, an eye, and nose, mouth, an ear, or any other facial feature of the subject, either in whole or in part. In one or more embodiments, at least a portion of the line drawing is generated based on control points 718-724, and modification of control points 718-724, including one or more of an addition, move, or removal, results in the modification of the line drawing.

In one or more embodiments, user interface 700 further includes one or more slider 728-730 associated with one or more parameters of personalized digital face chart 726. Sliders 728-730 may be configured to affect the one or more parameters of the personalized digital face chart 726, resulting in one or more face chart modifications based on a change in position of sliders 728-730. In one or more embodiments, at least one of sliders 728-730 is associated with a degree of stylization of personalized digital face chart 726.

While the invention herein disclosed has been described by means of specific embodiments and applications thereof, numerous modifications and variations could be made thereto by those skilled in the art without departing from the scope of the invention set forth in the claims.

What is claimed is:

1. A computer-implemented method for providing a personalized digital face chart comprising:
   obtaining a digital image of a subject's face;
   identifying a facial region of said digital image from a background region of said digital image;
   generating a line drawing based on at least said facial region of said digital image, wherein said line drawing comprises at least one facial feature region comprising minimal shading for the application of at least one beauty product associated with an associated facial feature;
   stylizing said line drawing to generate a personalized digital face chart;
   providing a user interface configured to accept at least one face chart modification from a user; and
   modifying said personalized digital face chart based on said at least one face chart modification;
   generating a printed customized face chart by printing said modified personalized face chart on specialized paper configured with an absorbency, thickness, and texture to adhere makeup or any other beauty product applied directly to the paper's surface.

2. The computer-implemented method of claim 1, wherein said at least one face chart modification comprises manually choosing a feature style for a selected feature characteristic from a selection of feature styles.

3. The computer-implemented method of claim 2, wherein said selected feature characteristic comprises an eye shape.

4. The computer-implemented method of claim 2, wherein said selected feature characteristic comprises an eye crease.

5. The computer-implemented method of claim 1, wherein said user interface comprises at least one slider associated with a parameter of said personalized digital face chart, wherein said at least one face chart modification comprises a change in position in said at least one slider affecting said parameter.

6. The computer-implemented method of claim 1, wherein said user interface comprises at least one slider associated with a degree of stylization of said personalized digital face chart, wherein said at least one face chart modification comprises a change in said degree of stylization.

7. The computer-implemented method of claim 1, wherein generating said line drawing based on said at least one facial region comprises generating a line drawing of a hair area of said subject by:
   obtaining at least one foreground selection comprising said hair area of said subject in said digital image;
   obtaining at least one background selection excluding said hair area of said subject in said digital image;
   determining a calculated hair area of said digital image, wherein said calculated hair area is determined based on said foreground selection and said background selection; and
   generating a line drawing of said hair area based on said calculated hair area.

8. The computer-implemented method of claim 7, wherein said digital image of said subject is taken with said subject in front of a monochromatic backdrop and wherein said background selection is determined using at least one chromakeying technique.

9. The computer-implemented method of claim 1, further comprising evaluating a hair area of said digital image for the presence of at least one hairstyle feature, wherein generating said line drawing comprises rendering at least one curve associated with said hair area, wherein said at least one curve comprises at least one curve discontinuity associated with said at least one hairstyle feature.

10. The computer-implemented method of claim 9, wherein said at least one hairstyle feature is selected from the group consisting of a hairline shape, a widows peak, and a part.

11. The computer-implemented method of claim 1, wherein said digital image is obtained using an imaging device comprising a photographic flash placed above said imaging device, and wherein said identifying said facial region comprises determining a chin location based on a defined shadow in said digital image.

12. The computer-implemented method of claim 1, further comprising obtaining three-dimensional data of said subject obtained with at least one three-dimensional imaging device, wherein said three-dimensional data of said subject is used to identify said facial region of said digital image from said background region of said digital image.

13. The computer-implemented method of claim 1, wherein said at least one face chart modification comprises an omission of one or more omitted features.

14. The computer-implemented method of claim 1, wherein said user is said subject.

15. The computer-implemented method of claim 1, wherein said user is a beauty expert.

16. The computer-implemented method of claim 1, further comprising the step of generating a plurality of control points associated with at last one facial feature of said subject, wherein said line drawing is generated based on said plurality of control points,
   wherein said user interface comprises a display area showing said plurality of control points, wherein said at least one face chart modification comprises adding, moving or removing one or more of said plurality of control points to modify said line drawing.

17. The computer-implemented method of claim 1, further comprising the steps of:
   obtaining an infrared image of said subject illuminated by an infrared illuminant source; and
   determining an eye position of said subject in said digital image based on infrared intensity in said infrared image;

wherein said eye position is used to identify said facial region of said digital image from said background region of said digital image.

18. The computer-implemented method of claim 1, wherein stylizing said at least one face chart comprises modifying a facial expression of said subject.

19. The computer-implemented method of claim 1, wherein said at least one face chart modification comprises manually selecting a facial expression.

20. The computer-implemented method of claim 1, further comprising the step of colorizing said personalized digital face chart based on one or more colors in said digital image,
wherein said at least one face chart modification comprises changing a coloring of said personalized digital face chart.

21. The computer-implemented method of claim 1, further comprising the step of storing an intermediate representation of said personalized digital face chart capable of generating a plurality of digital face chart versions using said user interface.

22. The computer-implemented method of claim 1, wherein said user interface is configured to display a plurality of products in response to user input associated with said personalized digital face chart, wherein said computer-implemented method further comprises simulating an application of a selected product selected from said plurality of products by digitally applying an effect to a selected facial feature region selected from said at least one facial feature region.

* * * * *